US008958943B2

(12) United States Patent
Bertosa et al.

(10) Patent No.: US 8,958,943 B2
(45) Date of Patent: Feb. 17, 2015

(54) METHOD AND APPARATUS FOR TRACKING, SCHEDULING, AND REMINDING ABOUT MAINTENANCE STATUS

(75) Inventors: Thomas Bertosa, Chardon, OH (US); Michael Gessner, Akron, OH (US); Bob Roberts, South Euclid, OH (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/494,384

(22) Filed: Jun. 12, 2012

(65) Prior Publication Data

US 2013/0332023 A1 Dec. 12, 2013

(51) Int. Cl.
*G06F 7/00* (2006.01)

(52) U.S. Cl.
USPC .......................................... 701/29.4; 701/469

(58) Field of Classification Search
USPC .......................................... 701/29.4, 469, 305
See application file for complete search history.

(56) References Cited

U.S. PATENT DOCUMENTS 6,604,033 B1 * 8/2003 Banet et al. .................. 701/33.2
7,477,968 B1 * 1/2009 Lowrey et al. ............... 701/29.3
7,672,756 B2 * 3/2010 Breed .............................. 701/1
7,739,007 B2 * 6/2010 Logsdon ...................... 701/31.5
8,626,568 B2 * 1/2014 Warkentin et al. ........... 705/7.38
2004/0093155 A1 * 5/2004 Simonds et al. .............. 701/200
2009/0076835 A1 * 3/2009 Carter et al. ...................... 705/1
2009/0326991 A1 * 12/2009 Wei et al. .......................... 705/5

OTHER PUBLICATIONS

International Search Report dated Dec. 23, 2013 for PCT/US13/44952; filed Jun. 10, 2013.

* cited by examiner

*Primary Examiner* — Mary Cheung
*Assistant Examiner* — Michael Berns
(74) *Attorney, Agent, or Firm* — Baker & Hostetler LLP

(57) ABSTRACT

An apparatus and method for tracking, scheduling, and reminding about maintenance status are provided. The apparatus connects to a vehicle and retrieves state information from the vehicle. The apparatus analyzes at least the state information to determine a maintenance status of the system, and creates an alert based on at least the maintenance status of the vehicle. The alert is provided to a user, and the user can instruct the apparatus to respond to the maintenance status through selection of options provided by the alert. Through the options, the apparatus may provide the user with options for maintenance service, schedule the service, and remind the user of the scheduled service.

17 Claims, 5 Drawing Sheets

METHOD AND APPARATUS FOR TRACKING, SCHEDULING, AND REMINDING ABOUT MAINTENANCE STATUS

FIELD OF THE INVENTION

The present invention relates generally to diagnostic equipment. More particularly, the present invention relates to managing the routine maintenance of vehicles with the diagnostic equipment.

BACKGROUND OF THE INVENTION

In many industries, diagnostic systems play an increasingly important role in manufacturing processes, as well as in maintenance and repair throughout the lifetime of the machine or product. Some diagnostic systems are based on personal computer technology and feature user-friendly, menu-driven diagnostic applications. These systems assist technicians and professionals at all levels in performing system diagnostics.

However, many such diagnostic systems are designed to diagnose a problem or symptom after it has materialized. Problems may often be preempted through proper service and maintenance of the machine or product. An exemplary machine may be a vehicle. Often vehicles come with owner manuals, which specify suggested service and maintenance at predetermined intervals, and may vary from vehicle to vehicle depending on various factors such as make, year and model.

Many vehicle problems may be prevented or mitigated through proper service and maintenance, but often such proper care for a vehicle is not practiced. In some instances, this is due to owner and operator ignorance or lack of attention or time. Other times the suggested service, maintenance and predetermined intervals may not align with common practice, and people may defer to generalized practices, which are not as effective as the suggested practice. Lack of convenient options to service and maintain the vehicle, or lack of time to make an appointment may also be factors in improper care.

It is desirable to provide a method and apparatus to track, schedule, and remind the vehicle owner or operator about suggested service and maintenance for the vehicle. Moreover, the method and apparatus may be able to interface with the vehicle and a remote device to track maintenance needs and inform the vehicle owner or operator when service and maintenance are required.

SUMMARY OF THE INVENTION

The foregoing needs are met, to a great extent, by the present invention, wherein in one aspect, a method and apparatus are provided such that some embodiments alert the vehicle owner of upcoming service and maintenance requirements.

In accordance with one embodiment of the present invention, a method for tracking, scheduling, and reminding about maintenance of a vehicle is provided, and includes the steps of opening a communication between the vehicle and a monitoring device, reading state information of the vehicle by the monitoring device, analyzing the state information of the vehicle by the monitoring device, creating a maintenance alert based on the analyzed state information by the monitoring device, formatting the alert for display on a remote device, and sending the alert from the monitoring device to the remote device, wherein the alert includes a maintenance calendar notice capable of being accepted on the remote device.

In accordance with another embodiment of the present invention, an apparatus for tracking, scheduling, and reminding about maintenance status of a vehicle is provided, and can include a first memory configured to store programmed software modules, including a vehicle connection module configured to effect communication between the vehicle and the apparatus, a vehicle state read module configured to retrieve a vehicle state information from the vehicle, a vehicle state comparator module configured to analyze the vehicle state information and to determine a maintenance status relating to the vehicle state information, a vehicle state alert module configured to create an alert based on the maintenance status, wherein the alert includes a maintenance calendar notice, and an instruction module configured to receive an instruction from a remote device in response to the alert and to execute a function related to the received instruction, a processor configured to execute the programmed software modules, a communication interface configured to couple the apparatus to a communication interface of the vehicle, and a communication device configured to communicate signals between the vehicle and the processor.

In accordance with still another embodiment of the present invention, a system for tracking, scheduling, and reminding about maintenance status of a vehicle is provided, and can include means for storing programmed software modules, including a vehicle connection module configured to effect communication between the vehicle and the system, a vehicle state read module configured to retrieve a vehicle state information from the vehicle, a vehicle state comparator module configured to analyze the vehicle state information and to determine a maintenance status relating to the vehicle state information, a vehicle state alert module configured to create an alert based on the maintenance status, wherein the alert includes a maintenance calendar notice, and an instruction module configured to receive an instruction from a remote device in response to the alert and to execute a function related to the received instruction, means for processing the programmed software modules, means for coupling the system to a communication interface of the vehicle, and means for communicating signals between the vehicle and the means for processing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

According to an embodiment of the present invention a method and apparatus are provided for tracking, scheduling, and reminding about vehicle maintenance status. The apparatus can communicate with a vehicle and inform a user of the vehicle's maintenance status and events. The vehicle maintenance status can be read from the vehicle, for example, from the vehicle's electronic control units (ECUs), or calculated based on information read from the vehicle and another input, such as from the user. The method and apparatus can also display information relating to the status or events of the vehicle to the user in audio and/or visual formats, either on an attached display or on a remote display or speakers or vibrate parts of the vehicle such as the steering wheel, seat (drivers or passenger), stick shift or the like. The display can be an integrated display in the vehicle or a remote display such as one on a portable device. Through the display, speakers or other parts of the vehicle, the user may be alerted to the status and events related to the vehicle and its maintenance status.

Figure 1:
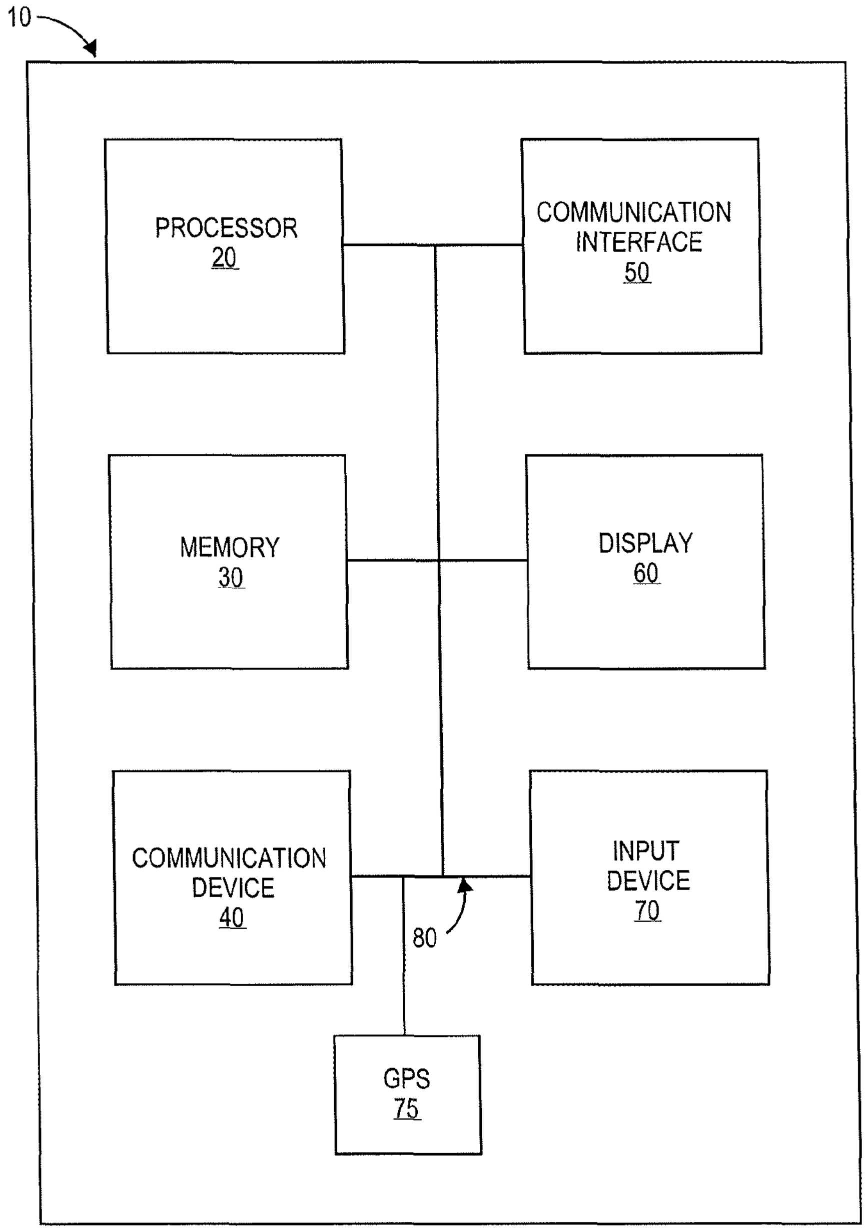
FIG. 1 illustrates components of an apparatus for tracking, scheduling, and reminding about maintenance status according to an embodiment of the invention.

The invention will now be described with reference to the drawing figures, in which like reference numerals refer to like parts throughout. FIG. 1 illustrates components of an apparatus for tracking, scheduling, and reminding about maintenance of the vehicle according to an embodiment of the invention. In one embodiment, the apparatus is a maintenance status device 10 that can gather data about the status of a vehicle and combine the vehicle status data with information stored on the maintenance status device 10, or with information provided from a source external to the maintenance status device 10. The data and information are processed by the maintenance status device 10 to provide the user with pertinent information about the maintenance status of the vehicle. The user receiving the information about the maintenance status of the vehicle can make decisions, which may help the user maintain the vehicle and avoid problems related to poor vehicle maintenance. The maintenance status device 10 can include a processor 20, a memory 30, a communication device 40, a communication interface 50, a display 60, an input device 70, a GPS (global positioning system) device 75 and a communication bus 80.

The maintenance status device 10 may be a general computing device, such as a personal computer (PC), a UNIX workstation, a server, a mainframe computer, a personal digital assistant (PDA), smartphone, cellular phone, a tablet such as an IPAD, or IPOD (from Apple) or some combination of these. Alternatively, the maintenance status device 10 may be a specialized computing device, such as a vehicle diagnostic scan tool (from Service Solutions US, LLC (Warren, Mich.), or a purpose built hardware and software device designed to interact with specific or multiple vehicle and access certain information from the vehicle's ECUs. The remaining components of the maintenance status device 10 may include programming code, such as source code, object code or executable code, stored on a computer-readable medium, like the memory 30 that may be loaded into a cache memory and processed by the processor 20 in order to perform the desired functions of the maintenance status device 10.

The processor 20 may be executed in different ways for different embodiments of the maintenance status device 10. One option is that the processor 20 is a device that can read and process data such as a program instruction stored in the memory 30 or received from an external source. Such a processor 20 may be embodied by a microcontroller. On the other hand, the processor 20 may be a collection of electrical circuitry components built to interpret certain electrical signals and perform certain tasks in response to those signals, or the processor 20 may be an integrated circuit, a field programmable gate array (FPGA), a complex programmable logic device (CPLD), a programmable logic array (PLA), an application specific integrated circuit (ASIC), or a combination thereof. Different complexities in the programming may affect the choice of type or combination of the above to comprise the processor 20.

Similar to the choice of the processor 20, the configuration of software of the maintenance status device 10 (further discussed herein) may affect the choice of memory 30 used in the maintenance status device 10. Other factors may also affect the choice of memory 30, such as price, speed, durability, size, capacity, and reprogramability. Thus, the memory 30 of the maintenance status device 10 may be, for example, volatile, non-volatile, solid state, magnetic, optical, permanent, removable, writable, rewriteable, or read-only memory. If the memory 30 is removable, examples may include a CD, DVD, or USB flash memory, which may be inserted into and removed from a CD and/or DVD reader/writer (not shown), or a USB port (not shown). The CD and/or DVD reader/writer, and the USB port may be integral or peripherally connected to the maintenance status device 10.

In various embodiments, the maintenance status device 10 may be coupled to a communication network 90 (see FIG. 2) by way of the communication device 40. In other embodiments, the communication device can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Working in conjunction with the communication device 40, the communication interface 50 can provide the hardware for either a wired or wireless connection. For example, the communication interface 50 may include a connector or port for an OBD (On Board Diagnostic), Ethernet, Universal Serial Bus (USB), serial, or parallel, or other physical connection. In other embodiments, the communication interface 50 may include an antenna (transceiver) for sending and receiving wireless signals of various protocols, such as, Bluetooth, Wi-Fi, ZigBee, cellular telephony, and other radio frequency (RF) protocols. The maintenance status device 10 can include one or more communication interfaces 50 designed for the same or different types of communication. Further, the communication interface 50 can be designed to handle more than one type of communication.

Additionally, an embodiment of the maintenance status device 10 may communicate information to the user through the display 60 and request user input through the input device 70, by way of an interactive, menu-driven, visual display-based user interface, or graphical user interface (GUI). Alternatively, the communication may be text based only, or a combination of text and graphics. Another form of communication can include vibration of the vehicle seat to alert the driver or passenger that maintenance on the vehicle is due or is coming up within a predetermined time such as a couple of days or weeks.

The user interface may be executed, for example, on a personal computer (PC) with a mouse and keyboard, with which the user may interactively input information using direct manipulation of the GUI. Direct manipulation may include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

Figure 2:
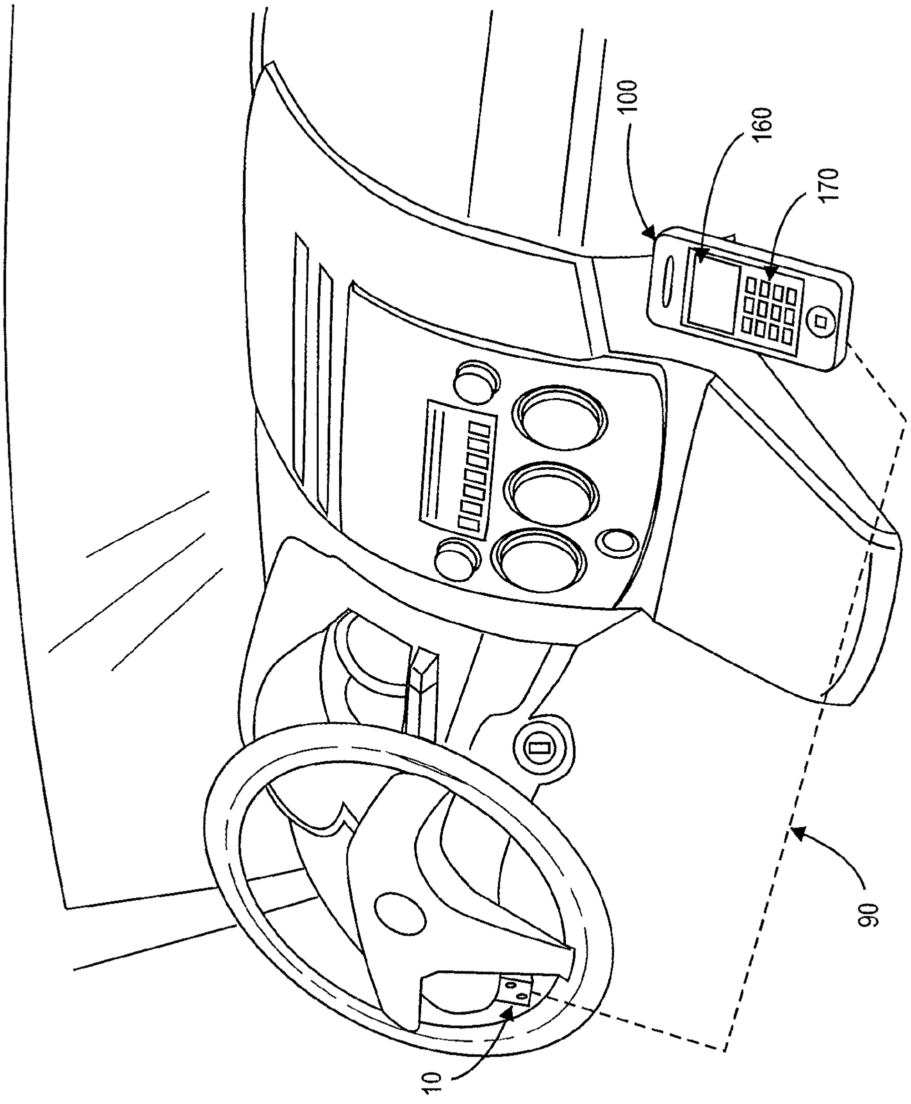
FIG. 2 is a schematic diagram illustrating an apparatus for tracking, scheduling, and reminding about maintenance status according to an embodiment of the invention.

The different components of the maintenance status device 10 can be linked together, to communicate with each other, by the communication bus 80. In various embodiments, any combination of the components can be connected to the communication bus 80, while other components may be separate from the maintenance status device 10 and may communicate to the other components by way of the communication interface 50. For example, as seen in FIG. 2, the display 60, and in some embodiments the input device 70, can be excluded from the maintenance status device 10, and instead a separate remote device 100 may include a display 160 and/or an input device 170.

The remote device 100 can include a purpose built device for use with the maintenance status device 10. In other embodiments, the remote device 100 can be a device, such as a smart phone (IPhone, Android, Windows, etc.), an integrated vehicle computer, a PC, or any of the examples given in relation to the maintenance status device 10, that can run software to allow the remote device 100 to interact with the maintenance status device 10.

Figure 3:
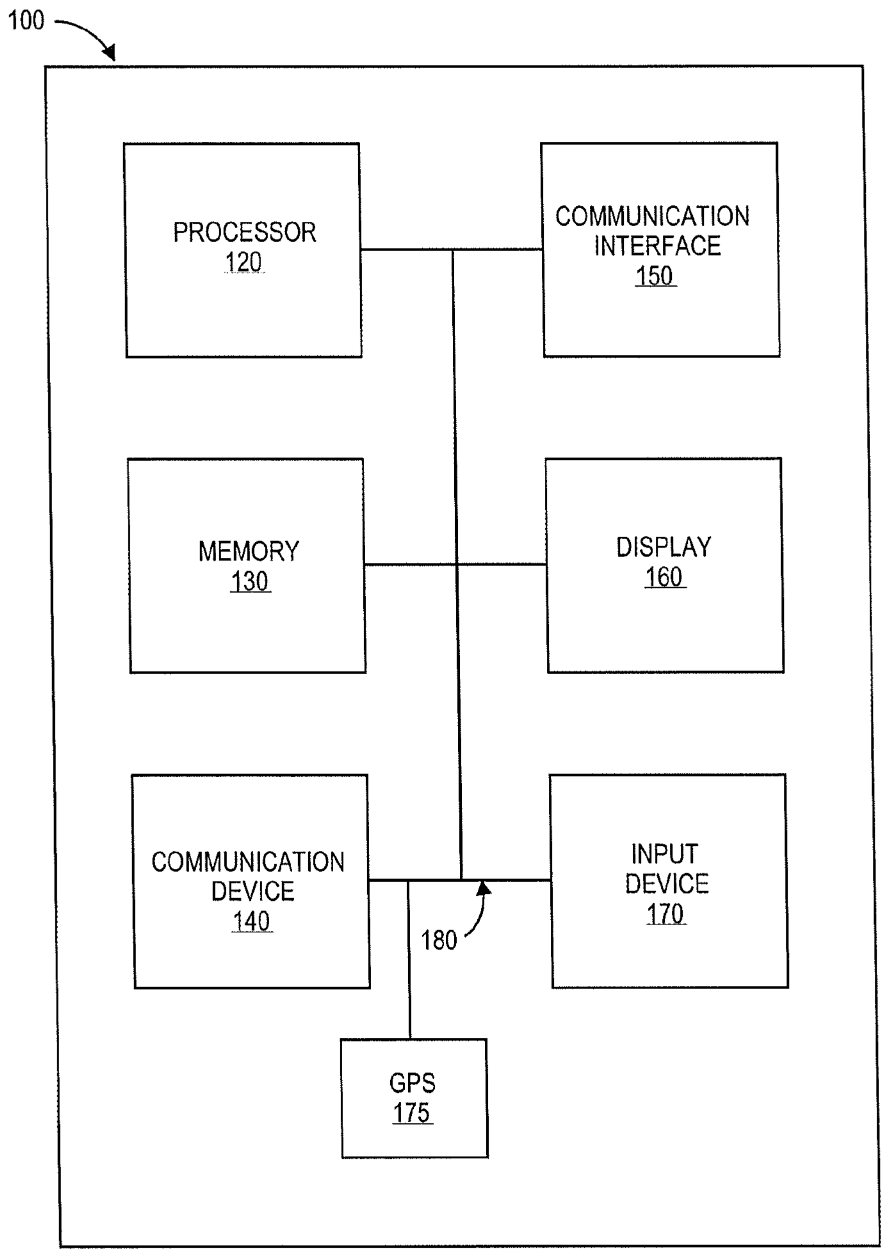
FIG. 3 illustrates the components of a remote device according to an embodiment of the invention.

FIG. 3 illustrates the components of the remote device 100 according to an embodiment of the invention. Much like the maintenance status device 10, the remote device 100 may also include a processor 120, a memory 130, a communication device 140, a communication interface 150, an input device 170, a GPS device 175 and a communication bus 180 that have similar functionality as maintenance status device 10. The embodiments herein including the remote device 100 do not necessarily preclude the maintenance status device 10 from having its own display 60 and input device 70 in addition the display 160 and/or input device 170 of the remote device 100.

The maintenance status device 10 may communicate with the remote device 100 over the communication network 90 via their respective communication interfaces 50, 150. The communication network 90 can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; cellular system; satellite system; a combination of any number of distributed processing networks or systems or the like.

Figure 4:
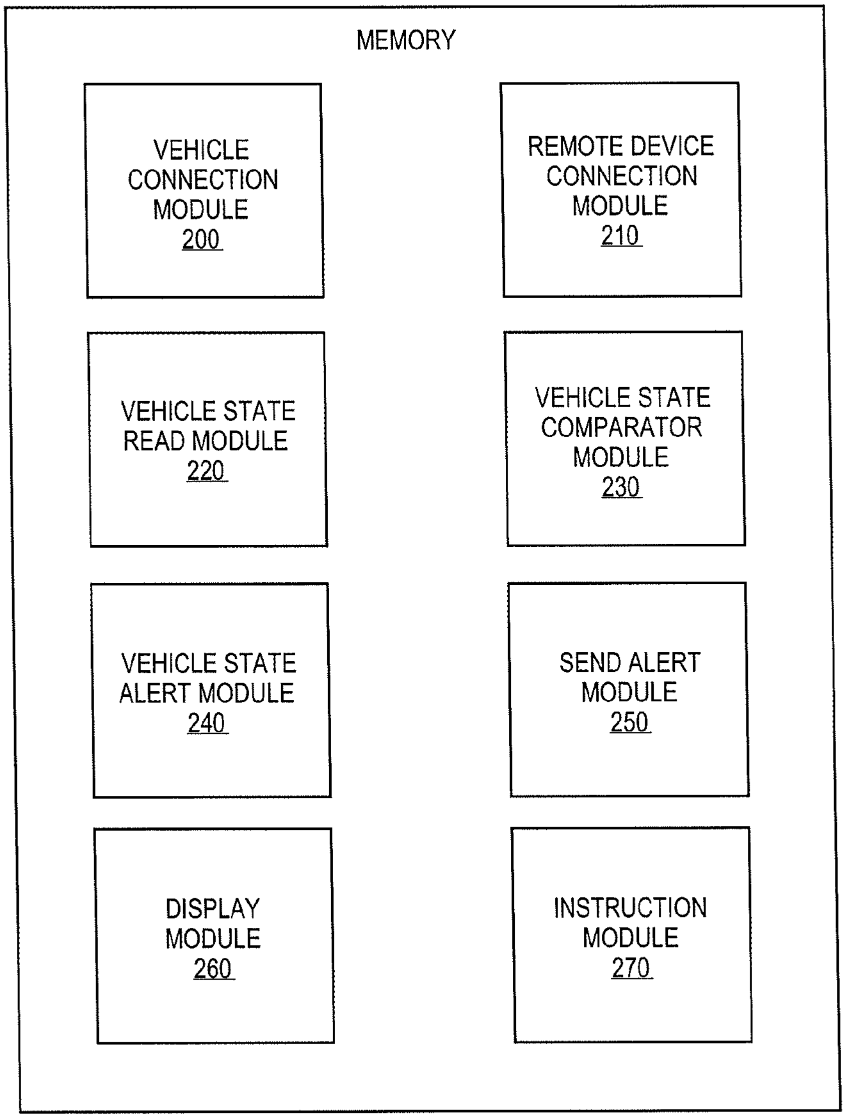
FIG. 4 is a block diagram illustrating the modules of the apparatus of FIG. 1 for tracking, scheduling, and reminding about maintenance status according to an embodiment of the invention.

Referring now to FIG. 4, the memory 30, 130 of the maintenance status device 10 and remote device 100 may store a variety of programmed software instruction modules, which may be executed by the processor 20, 120, respectively. The modules can operate on both the maintenance status device 10 and remote device 100 and may include: a vehicle connection module 200, a remote device connection module 210, a vehicle state read module 220, a vehicle state comparator module 230, a vehicle state alert module 240, a send alert module 250, a display module 260, and an instruction module 270.

The memory 30, 130 can also store information and alerts for many vehicles, such as two, five, ten, twenty, hundred or other amounts as needed. This way the alerts can be generated as needed for as many vehicles as needed.

Generally, the maintenance status device 10 connects to the vehicle via the communication interface 50. The connection may be either wired or wireless, as described herein. In one embodiment, the communication interface 50 may be a connector compatible with an OBDII connector (data link connector) of a vehicle. At the user's discretion, once the communication interface 50 of the maintenance status device 10 is coupled to the OBDII connector in the vehicle, the maintenance status device 10 can remain coupled indefinitely, or it can be decoupled at any time. Once coupled, the maintenance status device 10 can draw power from the vehicle to operate and the vehicle connection module 200 can be initiated to open a communication channel between the vehicle and the maintenance status device 10.

In an alternative embodiment, the maintenance status device 10 can be powered by other means, for example, a battery, a power outlet (in the vehicle or wall), or solar power. In such instances, the maintenance status device 10 can be selectively powered on and off by the user by either connecting it to a power source or by engaging a power control mechanism, for example, a button, a switch, a dial, a knob, and the like.

Once the maintenance status device 10 is powered on and the connection module 200 is initiated, the opening of a communication channel between the vehicle, including the vehicle's ECUs, and the maintenance status device 10 may be conducted in accordance with standard communication protocols for communicating via an OBDII connection. Such standard communication protocols may include ISO 9141-2, CAN, K-Line, Keyword 2000, and SAE J1850 VPW or PWM. In another embodiment, the opening of the communication channel and proceeding communication may be conducted via a proprietary method or a combination of standard and proprietary methods.

The vehicle state read module 220 may be initiated after the communication channel is open between the vehicle and the maintenance status device 10. The vehicle state read module 220 can be programmed to retrieve all or some vehicle information from the ECUs. In some embodiments, the vehicle state read module 220 can target all or specific vehicle information from select ECUs, or it can target all or specific vehicle information from all of the ECUs. For example, the vehicle state read module 220 may read information from the ECUs that relates to mileage, tire pressure, vehicle component performance data, vehicle warning signals (like a check engine light), vehicle fluids and gas readings, and the like. The information extracted by the vehicle state read module

220, such as diagnostic trouble codes (DTCs) can be saved in memory 30 and be used to track vehicle maintenance status, remind the user of pending or overdue vehicle maintenance, and schedule vehicle maintenance appointments.

The tracking, reminding, and scheduling of vehicle maintenance are reliant on knowing the vehicle maintenance status. In some instances, the vehicle maintenance status are immediately identifiable from the information retrieved by the vehicle state read module 220, for example, when DTCs are retrieved, which would indicate that service is required.

However, with other information, it may be necessary to analyze the information prior to determining the vehicle maintenance status. The vehicle state comparator module 230 may access the information retrieved by the vehicle state read module 220 and other information from the memory 30, or an external source, such as a remote computing device in communication with the maintenance status device 10 via the communication network 90. The other information can include information relating to the normal operating conditions or general maintenance status for vehicles of the same type, or previous maintenance of the vehicle. Other information can include status of the use of the vehicle, such as the vehicle is in the shop for extended repairs after an accident or that it is in storage for a period of time. Using the information retrieved from the vehicle by the vehicle state read module 220 and the other information, the vehicle state comparator module 230 can analyze the relevant information and determine the maintenance status indicative of the information retrieved from the vehicle.

An analysis that can be made by the vehicle state comparator module 230 to determine the maintenance status can include comparing the vehicle's mileage information with information indicating standard intervals of regular maintenance for the vehicle or comparing it with a desired maintenance level set by the user (such as every 3,000 miles, every month, every 500 hours of use). The desired maintenance level may be set arbitrarily by the user and can be based on the user's experience instead of known guidelines. Mileage may be obtained from Global Positioning Satellite (GPS) system that is part of the vehicle or be placed in the vehicle like a portable GPS unit, by GPS device 75, 175 or a smart phone. Mileage may be obtained by requesting it from the relevant ECU.

Maintenance status may be determined by queering the ECU to determine when the last time a certain diagnostic trouble code (DTC) has been set. Based on databases, it may be known the certain DTCs are set because a certain component may be close to failing. This way, a maintenance alert may be sent to the user as described herein.

A vehicle maintenance record book may be used to track the vehicle's maintenance. Information may be entered into the memory of the maintenance status device 10 and/or remote device 100 by the technician or by a user. The user or technician may enter that information manually or select items from a list.

Thus in one embodiment, from the comparison, the vehicle state comparator module 230 can determine if the vehicle mileage is within various different thresholds, which coincide with vehicle maintenance status. If the mileage of the vehicle is below the mileage indicated for the next regular maintenance event, then the vehicle state comparator module 230 can determine that the vehicle maintenance status is below a predetermined level at which the user should be notified of the vehicle maintenance status. While the vehicle mileage may be less than the mileage indicated for the next regular maintenance event, the vehicle mileage may be within a certain mileage range, for example 500 miles or less until the next regular maintenance event. In this instance, the vehicle state comparator module 230 can determine that the vehicle maintenance status is at a level where the user should be notified of the upcoming maintenance event. The mileage range leading up to the next regular maintenance event may be further broken down into sub-ranges, where the vehicle mileage is getting closer to the next regular maintenance event is expressed by a different maintenance status.

Continuing with this example, the vehicle state comparator module 230 can make similar determinations if the vehicle mileage is at or above the indicated mileage for the next regular maintenance event. Different maintenance status can be determined by the analyses of the vehicle state comparator module 230 based on the number of miles by which the vehicle mileage has surpassed the indicated mileage for the next regular maintenance event.

The foregoing example is not meant to be limiting in any way. For example, maintenance intervals may also be measured by time rather than distance, or by pressure and/or temperature or other sensor readings. The information analyzed by the vehicle state comparator module 230 can vary depending on the types of maintenance events that the maintenance status device 10 is checking for. The maintenance status device can be programmed to apply to one or a variety of types of maintenance events. The procedures by which the vehicle state comparator module 230 determines the maintenance status can vary depending on the maintenance type. Additionally information from the maintenance record book, service interval database and estimated mileage may be used by the state comparator module 230.

The maintenance status determined by the vehicle state comparator module 230 can contain, indicate, or represent information related to the maintenance event. Such information can include, for example, a maintenance status value which represents a severity of the maintenance event or an urgency to attend to the maintenance event, the type of maintenance event, and an indication of the result of the analysis (e.g. a value indicating the miles to go until the maintenance event should occur, or miles passed since the maintenance event should have occurred). The vehicle state alert module 240 can read the information from the vehicle state comparator module 230 and construct an alert to be presented to the user. In embodiments where the information from the vehicle state comparator module 230 provides the information as actual values, it is possible for the vehicle state alert module 240 to assume the values for use in constructing the alert. Embodiments where the information from the vehicle state comparator module 230 provides indicators or representations of values, the vehicle state alert module 240 can interpret the meaning of these values for constructing the alert.

Continuing with the ongoing example, this procedure can include, the vehicle state alert module 240 reading the actual value information from the vehicle state comparator module 230. In this example the actual value can be the difference between the indicated mileage for the next regular maintenance event and the current vehicle mileage. The vehicle state alert module 240 can use this actual value to display to the user and to indicate to the user whether the value is below or above the threshold value for the maintenance status indicating the next maintenance event. The information can be a positive value potentially indicating that there are miles left before the next maintenance event or the information can be a negative value indicating that miles have passed since the relevant maintenance event.

In the instance where the value is positive, the vehicle state alert module 240 can construct the appropriate alert to indicate to the user when the next maintenance event will occur.

For example, the alert may contain an indicator of what the next maintenance event is. The indicator can be a text description of the next maintenance event (e.g. "75,000 mile service" or "oil change"), a graphical depiction of the next maintenance event (e.g. a wrench to indicate regular maintenance service, or an oil can to indicate an oil change), an audible description of the next maintenance event, or a combination of indicators. Vibration of the seat or the steering wheel may be done in certain intervals so that the user knows when the repair should be done. For example, the vibration may be minimal at 1,000 miles from vehicle maintenance, vibrate faster or more often when 500 miles from vehicle maintenance and constant vibration at 100 miles or less from vehicle maintenance. Vibration can also be set for the amount of time to vehicle maintenance or combination of both time and miles from vehicle maintenance.

The indicator can also include the value from the vehicle state comparator 230 showing the distance or time left until the next maintenance event. In some embodiments, the value may be displayed in a manner showing that the next maintenance event has not yet been reached. This can be done in a number of ways, for example, the mileage could be displayed plainly (whereas if the next vehicle event had been passed, it would be displayed in different manner), the mileage could be displayed in a color, such as green, blue, or yellow, it can be shown in a countdown format of miles until the next maintenance event, or it can be shown as actual mileage compared to the mileage of the next maintenance event.

Similarly, where the value is negative, the vehicle state alert module 240 can construct the appropriate alert to indicate to the user that a relevant maintenance event has passed. Indicators, like the ones mentioned above, but appropriately modified to indicate the passage of the relevant maintenance event has passed can be used. For example, displayed text and graphics can be displayed in different colors, such as yellow, orange, or red, the indicators can be animated to flash, the format of displaying the value can show that the mileage is above the mileage of the next maintenance event, and audible indicators can attract attention to the fact that the relevant maintenance event has passed.

In instances where the information from the vehicle state comparator module 230 provides indicators or representations of values, the vehicle state alert module 240 can construct an alert interpreting them. For example, when an indicator light is triggered on the dashboard (such lights can include, for example, a check engine indicator, an oil pressure indicator, a tire pressure indicator, a battery voltage indicator, and the like), the vehicle state comparator 230 can provide a signal indicating that such an event has occurred. The vehicle state alert module 240 can read that information from the vehicle state comparator, and compose an appropriate alert. The alert can include textual, graphical, audible indicators and/or vibrational like the ones described herein. In an example, when the check engine light is triggered, the vehicle state alert module 240 can create a simple alert describing that the check engine light has been triggered and that vehicle maintenance is required. Alternatively, since the check engine light is often an ambiguous indicator, the vehicle state alert module 240 may provide information in the alert as to the state of the vehicle based on other information read from the vehicle state comparator 230. An example of such information may include a snapshot of readings from the vehicle's ECUs, or an indication that certain readings are not within the range of normal operation.

The send alert module 250 can determine when, where and how to send the alert created by the vehicle state alert module 240. In other embodiments, certain vehicles can be opted out so that an alert would not be sent for the opted out vehicles. Some alerts, as described herein, can be more urgent than others. In sending alerts to be displayed to the user, there are safety concerns if the user is also driving the vehicle. To lessen distractions to a user while driving, some alerts, which are not critical to the driver at the moment, can be sent in a delayed manner in which the alert is stored and sent when the vehicle is not being actively driven. The alert can be sent when the vehicle is in park, when the vehicle is not in motion for a period of time, such as at a red light or soon after the vehicle is started. Alternatively, the alert can be sent at any time, however, if the alert is not critical, then the alert may not be displayed immediately. Instead a notification that an alert is waiting to be viewed can be temporarily displayed, and the user can access the alert at a later time. The sequence of displaying a notification and later accessing the alert can also be implemented for critical alerts. In some embodiments, the notification can indicate the importance of the alert. At other times, whether the alert is critical or not, the alert may be sent soon after it is created and be displayed on a display.

The alerts can also be sent to anyone desired by the user, such as parents, mechanics, assistants and the like. The alerts may be sent via email, text, and the like to another phone or location.

In one embodiment, the alert can include technical service bulletins (TSB). This way the user can alert a technician for an issue that the technician may not be aware of. This could lead to a more efficient service of the vehicle and that any vehicle issues that can be fixed based on the TSB or under warranty can also be fixed at the same time.

In another embodiment, the processor may run the various modules in the background. Thus, the processor can run the comparison and determine when an alert needs to be sent even if the software is not "activated" by the user.

As discussed herein, the display 60 can be integral or the display 160 can be separate from the maintenance status device 10. Therefore, depending on the implementation of the display 60, 160, the send alert module 250 may have to initiate the remote device connection module 210 to connect to the display 160 if it is remote from the maintenance status device 10. To identify where to send the alert, the remote device 100 could be paired or registered with the maintenance status device 10 or email address, cell and fax numbers and the like. Thus, the memory 30 stores an identifier for the remote device 100 and the protocol used to connect to the remote device 100. The send alert module 250 can retrieve the remote device information and initiate the remote device connection module 210 to connect to the remote device 100 over the communication network 90 via the communication device 40, 140, and the communication interface 50, 150, as discussed herein.

The alert produced by the vehicle state alert module 240 can provide instructions for the display module 260 to display on the display 60, 160, the information of the alert in the specified way. The display module 260 can format how the information is displayed on the display 60, 160. The formatting can include, for example, scaling the size of the information, adjusting the colors of the information, flashing the information, vibrating the display, adjusting the resolution of the information, adjusting volume, tone, pitch, and other audio variables of the information, all according to the capabilities of the display 60, 160.

The alert can display more than just information about the alert. Depending on the alert, the vehicle state alert module 240 can provide options among which the user may select to initiate a response. The instruction module 270 receives the option selections and initiates a response based on the user's selection. In some instances the response can be an acknowledgement that the user has read the alert, such as by clicking an "ok" button. The user can also clear the alert by making an entry into the maintenance book. Another option allows the user to reset the reminder for a period of time (e.g. one week) or by distance (e.g. 500 miles) or any other factors.

In other instances, the options provided to the user can include, for example: contacting roadside assistance, contacting emergency services, contacting parents, spouses, children, adding maintenance event reminders to a calendar, identifying business locations that can provide parts and/or services, contacting the business locations to determine if the parts or service are available and cost estimates, comparing variables that can affect the user's decision to select a business to attend to the alert (such as part or service time availability, cost, location, business hours), and scheduling appointments and adding them to the calendar. Information about the business may be gathered by communicating with the business via a connection with the business' computers through a distributed network, such as the internet.

In the event that the remote device 100 does not have the necessary contact information of the business for parts or services, for example, the contact information may be displayed for the user for selection or use. In another embodiment, the vehicle state alert module 240 can search the remote device's 100 contact information for the user's favorite repair shop, such as National Tire and Battery (NTB) and then determine the closest NTB based on the remote device location (using the remote device's global positioning system) and push that information to the user.

Based on the option selected by the user, the instruction module 270 can initiate and instruct other modules to execute the instructions provided by the user. In some instances, the instruction module 270 can instruct the remote device 100 to execute some of the operations. For example, if the remote device 100 is a smart phone, the instruction module 270 can interact with its telephone software to contact roadside assistance or emergency services by dialing programmed phone numbers, like 9-1-1. If the remote device 100 has the ability to connect to a data network, like the internet, the instruction module 270 may connect to a remote information source, such as a database, a remote network of computers, or a remote server which houses software to execute some of the instructions. Through this connection, the instruction module 270 can send a query to the remote information source to return information relating to identifying business locations that can provide parts and or services; contacting the business locations to determine if the parts or services are available and cost estimates; comparing variables that can affect the user's decision to select a business, contact information of parents, spouses, and children, and scheduling appointments. The remote device 100 may also include calendar software, which the instruction module 270 may access to update the calendar with maintenance event reminders and service appointments.

It is also conceived that the maintenance status device 10 has the capability of connecting to telephone and data networks to execute these instructions. The maintenance status device 10 may also have calendar software to keep track and remind the user of maintenance event reminders and service appointments.

Figure 5:
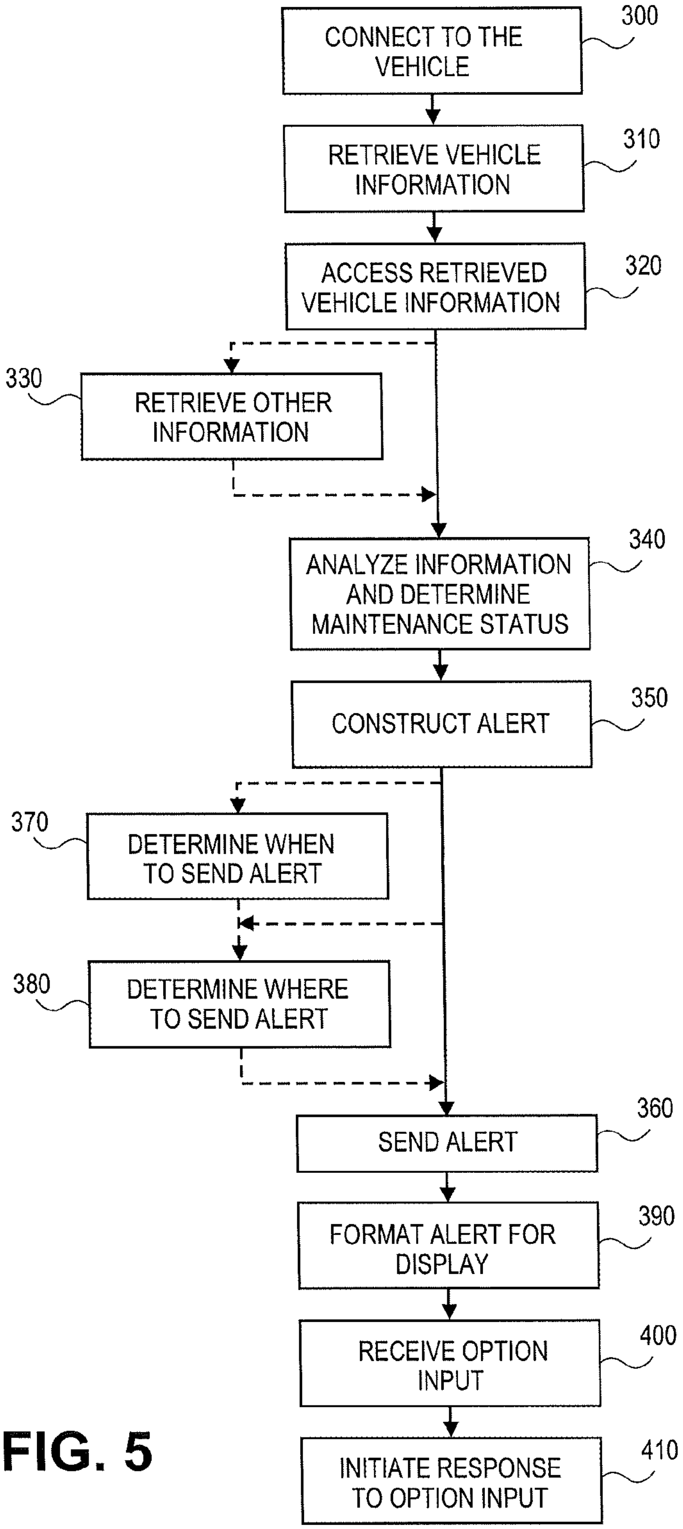
FIG. 5 is a flowchart illustrating steps that may be followed to track, schedule, and remind about maintenance status according to an embodiment of the invention.

FIG. 5 illustrates a flow chart depicting an embodiment of a method for tracking, scheduling, and reminding about maintenance status. Once the maintenance status device 10 is powered on, it first connects to the vehicle (step 300). In connecting to the vehicle, the maintenance status device 10 determines the proper vehicle communication protocol for the ECUs that it wants to extract information from. The proper vehicle communication protocol may be based in vehicle identification information, such as VIN, manufacturer, model, year, current mileage, engine type, and other similar information. Then the maintenance status device 10 opens a channel of communication with the connected vehicle.

Once the channel of communication is opened with the vehicle, the maintenance status device 10 retrieves vehicle information (step 310) from the ECUs. In some embodiments, the maintenance status device 10 can target all or specific vehicle information from select ECUs, or from all of the ECUs.

The maintenance status device 10 can then access the information retrieved from the vehicle (step 320), and optionally, retrieve other information (step 330) from the memory 30, or an external source, such as a remote computing device. The other information can include information regarding maintenance intervals for a vehicle, or part of vehicles based on retrieved DTCs. Additionally, the other information may include the top fixes based on the retrieved DTCs. The other information may also be stored on the maintenance status device 10.

In one embodiment, the initial entered odometer reading may be 38,000 miles on Jan. 1, 2012, the maintenance interval database may indicate change engine oil and filter every 6,000 miles or 3 months and the maintenance record book has the oil change entry for 40,000 miles on Feb. 12, 2012.

Using the information retrieved from the vehicle, and optionally the other information, the maintenance status device 10 can analyze the relevant information and determine the maintenance status (step 340) of the vehicle.

Based on the information from the vehicle and resulting from the analysis, the maintenance status device 10 can construct an alert (step 350) to the user. The maintenance status determined by the maintenance status device 10 can contain, indicate, or represent information related to the maintenance event. For example, based on the information retrieved in step 340, the alert can be sent on May 7, 2012 if the alert is set for 5 days' notice. Additionally, the alert can include contact information of the business for parts or services. The alerts can also send maintenance schedule for calendaring on the remote device 100. Embodiments where the information provides indicators or representations of values, the maintenance status device 10 can interpret the meaning of these values for constructing the alert.

When an alert is created, the maintenance status device 10 can send the alert to a display (step 360). At times, the alert may be sent soon after it is created. In some instances, it can be optionally determined when to send the alert (step 370). In sending alerts to be displayed to the user, there are safety concerns if the user is also driving the vehicle. This may be determined if the GPS in the vehicle or on any of the devices described herein shows movement of the vehicle. To lessen distractions to a user while driving, some alerts can be sent in a delayed manner in which the alert is stored and sent when the vehicle is not being actively driven. In another embodiment, the alert can be sent at any time, but it may not be displayed immediately, instead a notification that an alert is waiting to be viewed can be temporarily displayed, and the user can access the alert at a later time.

After steps 370 or 350, the maintenance status device 10 can optionally determine where to send the alert (step 380) when the display 60 is remote from the maintenance status device 10. The remote device 100 will have been paired or registered with the maintenance status device 10, and an identifier is stored on the memory 30 of the maintenance status device 10 and the protocol used to connect to the remote device 100. The remote device information can be retrieved from the memory 30 and a connection to the remote device 100 can be made. Alternatively or in conjunction email, text and the like of the alert can be sent to various registered email address, cell phone and fax numbers. Once it has been determined where to send the alert, the alert is sent to the desired devices (step 360).

The alert may be formatted to properly display on the display 60 (step 390). The user can interact with the display 60, via the input device 70, and the maintenance status device 10 can receive an option input (step 400) and initiate a response (step 410). The option input is correlated with a designated response.

FIGS. 1-5 are diagrams and flowcharts of methods and systems according to various embodiments of the present invention. It will be understood that each step of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIGS. 1-5 depict the system of various embodiments potentially including a general-purpose computer by which the embodiments of the present invention may be implemented. Those of ordinary skill in the art will appreciate that a computer can include many more components than those described herein. However, it is not necessary that all of these generally conventional components be shown in order to disclose an illustrative embodiment for practicing the invention. The general-purpose computer can include a processing unit, and a system memory, which may include random access memory (RAM) and read-only memory (ROM). The computer also may include nonvolatile storage memory, such as a hard disk drive, where additional data can be stored.

An embodiment of the present invention can also include one or more input devices, such as a mouse, keyboard, and the like. A display can be provided for viewing text and graphical data, as well as a user interface to allow a user to request specific operations. Furthermore, an embodiment of the present invention may be connected to one or more remote computers via a communication device. The connection may be over a communication network 50, such as a local area network (LAN) wide area network (WAN), and can include all of the necessary circuitry for such a connection.

Typically, computer program instructions, such as portions of the method for tracking, reminding, and scheduling of vehicle maintenance, may be loaded onto the computer or other general purpose programmable machine to produce a specialized machine, such that the instructions that execute on the computer or other programmable machine create means for implementing the functions specified in the flowchart. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the flowchart.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the flowchart steps.

Accordingly, steps of the flowchart support combinations of means for performing the specified functions, combinations of steps for performing the specified functions and program instruction means for performing the specified functions. It will also be understood that each step of the flowchart, as well as combinations of steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for tracking, scheduling, and reminding about maintenance status of a vehicle, comprising the steps of:

opening a communication between the vehicle and a monitoring device, wherein the monitoring device is removably coupled to the vehicle;

reading state information of the vehicle by the monitoring device;

analyzing the state information of the vehicle by the monitoring device;

creating a maintenance alert, if maintenance is needed, based on the analyzed state information by the monitoring device;

formatting the maintenance alert for display on a remote device, wherein the formatted maintenance alert includes color indicators indicating whether the needed maintenance is due or is overdue; and sending the maintenance alert from the monitoring device to the remote device when the vehicle is determined by a global positioning system as not being driven, wherein the maintenance alert includes a maintenance calendar notice capable of being accepted on the remote device, and wherein sending the maintenance alert further comprises determining if it is safe to send the maintenance alert.

2. The method of claim 1, further comprising the steps of:

sending to the remote device contact information for a business that provides parts and services for the vehicle;

receiving an instruction by the monitoring device; and executing a function related to the received instruction by the monitoring device.

3. The method of claim 2, wherein executing the function further comprises executing at least one of the following: identifying a business location that provides a part or a service, contacting the business location to determine if the part or the service is available, contacting the business location to determine a cost of the part or the service, scheduling an appointment, and adding the appointment to the calendar.

4. The method of claim 1, further comprising the steps of:

accessing normal operating parameters related to the state information of the vehicle, the normal operating parameters stored on a memory of the monitoring device; and comparing the state information of the vehicle with the normal operating parameters.

5. The method of claim 1, wherein sending the maintenance alert further comprises determining where to send the alert by the monitoring device.

6. The method of claim 1, wherein the remote device is a smart phone and wherein creating the maintenance alert further comprises indicating a degree of the maintenance status.

7. The method of claim 1, wherein the sending the maintenance alert step further comprises a notice that the maintenance alert is available.

8. An apparatus for tracking, scheduling, and reminding about maintenance status of a vehicle, comprising:

a first memory configured to store programmed software modules, including:

a vehicle connection module configured to effect communication between the vehicle and the apparatus;

a vehicle state read module configured to retrieve a vehicle state information from the vehicle;

a vehicle state comparator module configured to analyze the vehicle state information and to determine a maintenance status relating to the vehicle state information;

a vehicle state alert module configured to create an alert based on the maintenance status, wherein the alert includes a maintenance calendar notice and wherein the alert includes color indicators indicating whether the maintenance status is due or is overdue;

a send alert module that sends the alert to a remote device when the vehicle is not being driven; and an instruction module configured to receive an instruction from the remote device in response to the alert and to execute a function related to the received instruction;

a global positioning system that determines that the vehicle is not being driven;

a processor configured to execute the programmed software modules;

a communication interface configured to removably couple the apparatus to a communication interface of the vehicle;

a power control mechanism configured to selectively turn on and off the apparatus; and a communication device configured to communicate signals between the vehicle and the processor, wherein components are connected to at least one communication bus located within the apparatus, and wherein the send alert module determines when it is safe to send the alert to the remote device.

9. The apparatus of claim 8 further comprising:

an input device configured to provide input signals to the processor; and a display configured to display maintenance status alerts.

10. The apparatus of claim 8, wherein the vehicle state comparator module is further configured to access normal operating parameters related to the vehicle state information from the first memory or a second memory and to compare the vehicle state information with the normal operating parameters.

11. The apparatus of claim 10, wherein the vehicle state alert module is further configured to create the alert based on the comparison of the vehicle state information with the normal operating parameters.

12. The apparatus of claim 8, wherein the first memory further includes a remote device connection module configured to effect communication between the apparatus and the remote device.

13. The apparatus of claim 8, wherein the vehicle state alert module sends contact information of a business for parts or services.

14. The apparatus of claim 8, wherein the send alert module determines where to send the alert.

15. The apparatus of claim 8, wherein the instruction module is further configured to execute at least one of the following: identifying a business location that provide a part or a service related to the maintenance, contacting the business location to determine if the part or the service is available, contacting the business location to determine a cost of the part or the service, comparing variables that can affect a user's decision to select the business, scheduling an appointment, and adding the appointment to the calendar.

16. A system for tracking, scheduling, and reminding about maintenance status of a vehicle, comprising:

means for storing programmed software modules, including:

a vehicle connection module configured to effect communication between the vehicle and the system;

a vehicle state read module configured to retrieve a vehicle state information from the vehicle;

a vehicle state comparator module configured to analyze the vehicle state information and to determine a maintenance status relating to the vehicle state information;

a vehicle state alert module configured to create an alert based on the maintenance status, wherein the alert includes a maintenance calendar notice and wherein the alert includes color indicators indicating whether the maintenance status is due or is overdue;

a send alert module that sends the alert to a remote device when the vehicle is not being driven; and an instruction module configured to receive an instruction from the remote device in response to the alert and to execute a function related to the received instruction;

means for processing the programmed software modules;

a global positioning system that determines that the vehicle is not being driven;

means for coupling configured to removably couple the system to a communication interface of the vehicle;

means for selectively turning on and off the system;

means for communicating signals between the vehicle and the means for processing; and means for connecting configured to connect the means for storing, the means for processing, the means for coupling, and the means for communicating signals, wherein the means for storing further comprises normal operating parameters related to the vehicle state information, and the send alert module determines when it is safe to send the alert to the remote device.

17. The system of claim 16 further comprising:

means for providing input signals to the means for processing; and means for displaying maintenance status alerts.

* * * * *